Figure 1:
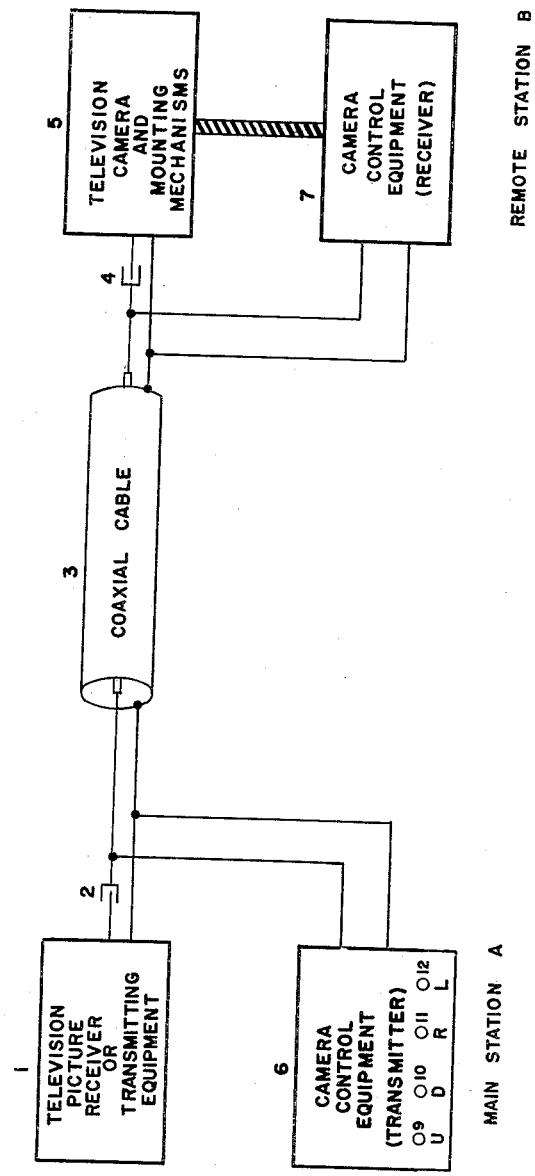

April 4, 1961

L. R. BREESE 2,978,538

REMOTE CONTROL SYSTEM

Filed April 7, 1958

3 Sheets-Sheet 1

INVENTOR.
LEMUEL R. BREESE

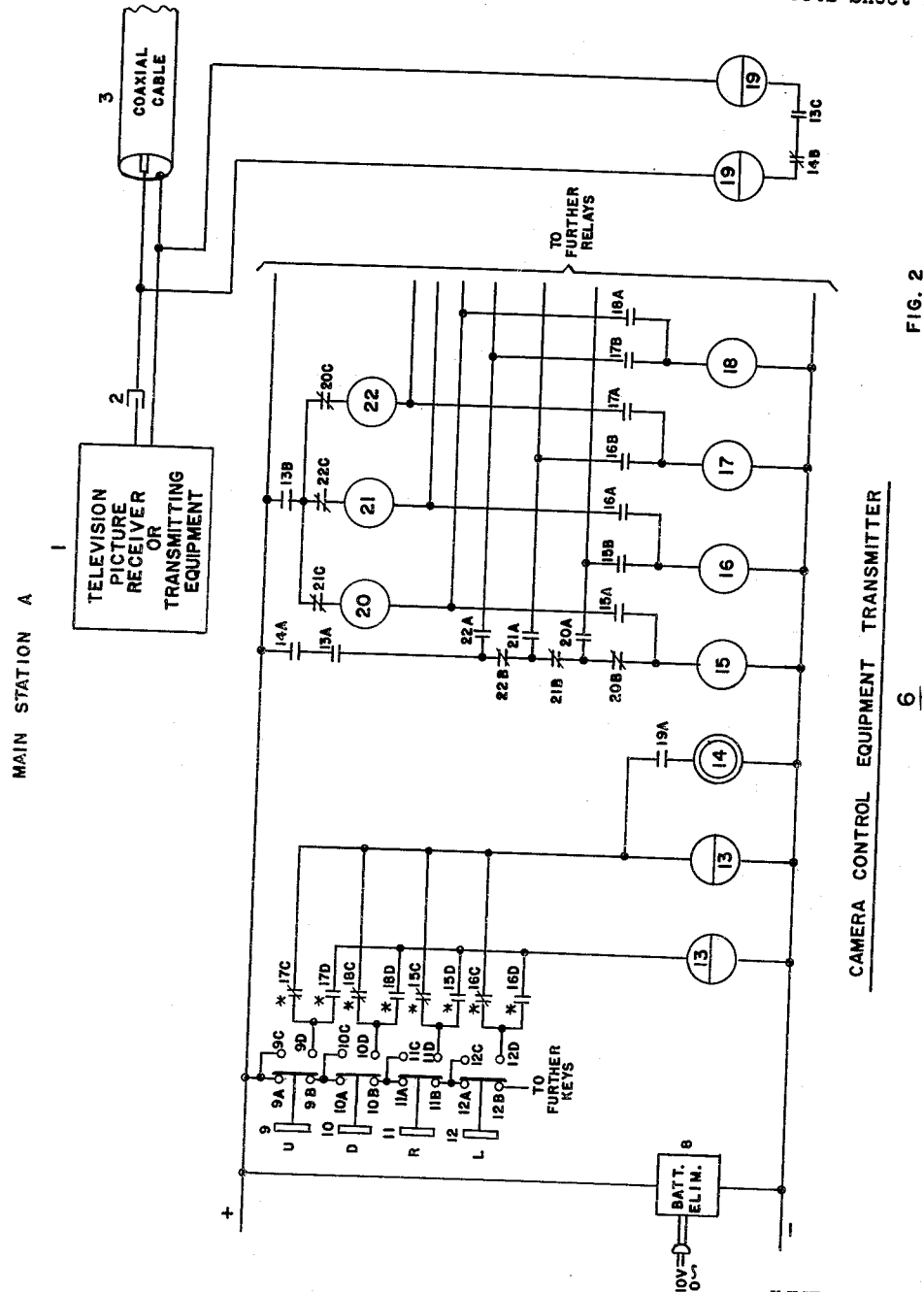

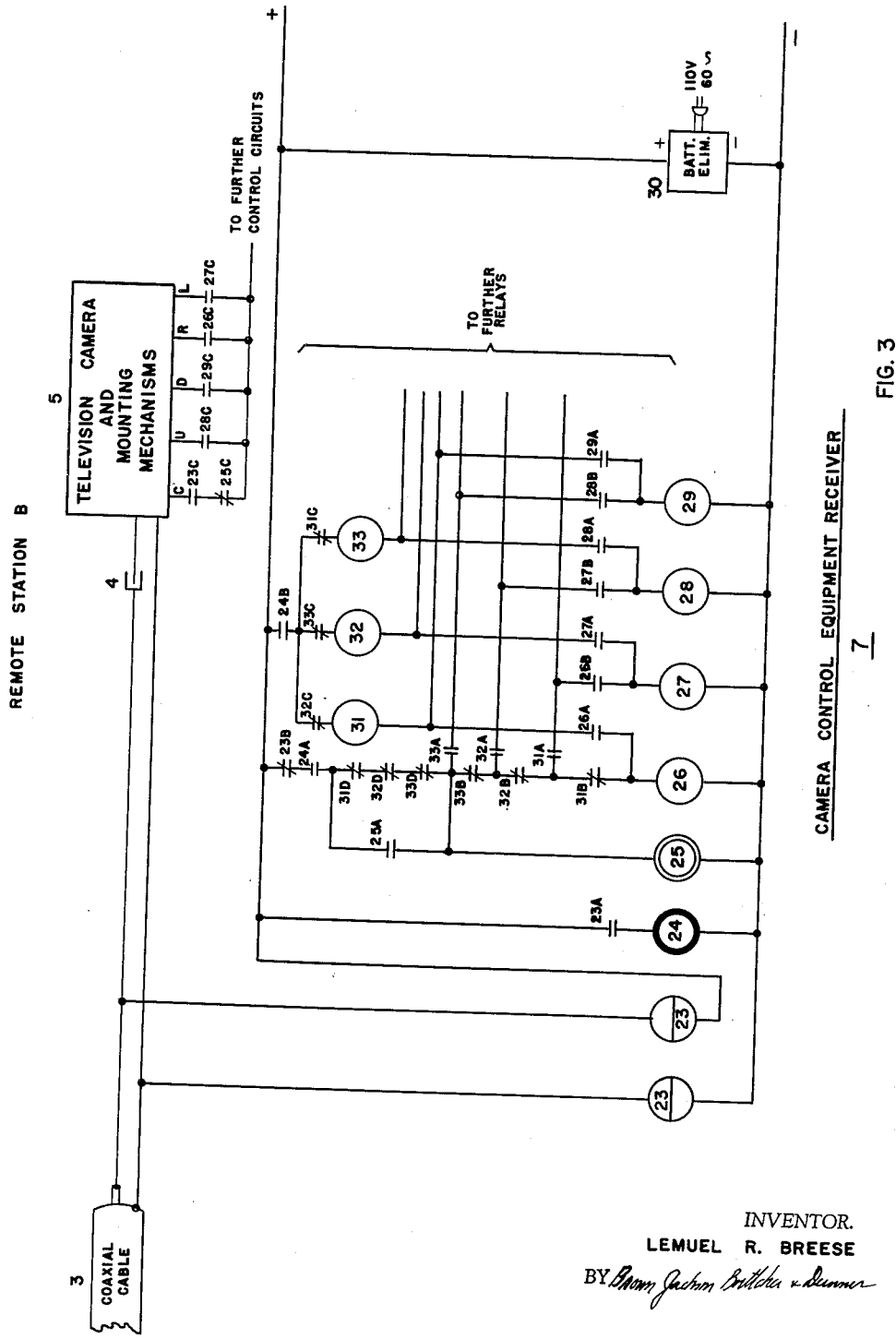

United States Patent Office

2,978,538
Patented Apr. 4, 1961

2,978,538

REMOTE CONTROL SYSTEM

Lemuel R. Breese, Galion, Ohio, assignor to North Electric Company, Galion, Ohio, a corporation of Ohio Filed Apr. 7, 1958, Ser. No. 726,815

7 Claims. (Cl. 178—6.8)

The present invention relates to a control system having video display means for use in controlling the condition of equipment located at a remote position, and particularly to a remote control system for use with a television closed circuit arrangement.

The use of supervisory equipment to control the operation of remotely located apparatus is well known in the art, and the use of such equipment has resulted in the more expeditious and reliable control of power line equipment, railroad block systems, flood gate members, and many other well known industrial and military installations. In each of such uses the supervisory control system basically comprises signal generating equipment located at a main station for selectively transmitting different signals to associated receiving equipment at the remote station, which is in turn operative responsive to receipt of the different types of signals to effect correspondingly different control operations thereat. In most systems, as the control function is effected, signal generating equipment at the substation effects the transmission of a report signal to the main station to indicate the condition of the apparatus at the substation. In a number of field applications, such manner of reporting is sufficient to attain satisfactory supervision. However, in certain applications, the limited nature of the reporting signals may be insufficient to permit the attendant to perform complete and satisfactory supervision of the equipment at the remote point.

With the comparatively recent development of video transmitting and receiving equipment in recent years there has been, therefore, an increased adaptation of such equipment for use with supervisory control systems for the purpose of providing to the attendant at the main station increased information relative to the condition of the apparatus at the remote station. In one exemplary application in the railroading field, a control operator at a central station controls the switching of the freight cars in a remote freight yard by means of a control switching system, and a number of video transmitting and receiver sets provide a visual display of the conditions in the freight yard to the main station at all times. In another known industrial application, a video transmitter unit is located to view the confines of a steel processing furnace, and an attendant located in the vicinity of the furnace controls the processing of the materials as guided by the visual display of the information relative to conditions within the furnace which is provided by the video transmitter unit to the receiver equipment located adjacent the attendant's control station. In a further application, a so-called closed circuit television system is used to provide a visual presentation of the procedural skills of outstanding medical practitioners for interested medical associates, the operation being scanned by video transmitter equipment located adjacent the practitioners and being transmitted to an associated receiver unit located for convenient viewing by the interested parties. These and many other uses of video display apparatus in facilitating control and supervision of equipment at remote places have provided a definite step forward in the art.

In each of these uses of the video transmitter and receiver equipment, the extent of the information which is satisfactorily displayed on the receiver unit is substantially dependent on and limited by the size of the viewing field scanned by the video transmitter equipment. It is essential therefore in the provision of the most complete informational set to the operation, to provide an arrangement which permits the control operator to selectively adjust the television cameras at the remote station to different positions and to thereby substantially increase the viewing field of the television camera. It is a primary object of the present invention to provide an economical control system for effecting rapid and reliable positioning of the video transmitter equipment over a substantially large viewing field and particularly to provide a compact, lightweight control unit of such type which is readily incorporated in most known types of television control systems.

In many known television control systems, the video transmitting unit is coupled to the video receiver unit by means of a so-called closed circuit arrangement, the coupling circuit being normally comprised, for purposes of economy, of a single coaxial cable which extends between the respective units for extending the video signals therebetween. Accordingly it is one specific object of the present invention to provide a novel control system which is readily coupled to the existing coaxial cable link of a closed circuit television installation for the purpose of controlling the position of the video camera at the remote position thereover.

It is a further specific object of the present invention to provide a remote control system in which the selection and control of the camera or other equipment at the remote station is performed by the manual operation of a single switch member at the control station, the duration of the control operation, between predetermined limits, being related to the time of operation of the manual control member at the control station. In achieving such object the system is provided with a novel control counting chain arrangement and associated switching circuitry which is particularly adapted to effect selective control operations in such manner.

According to specific features of the invention the system is not operative in response to the occurrence of a short in the coupling link which extends between the control and remote stations, and is not operative responsive to impulses that appear on the link during the period that a control circuit is closed to the adjusting equipment for the video camera.

These and other objects and features of the invention will become more apparent to parties skilled in the art with reference to the following specification and drawings in which:

Figure 1 is a general schematic diagram of one embodiment of the invention; and

Figures 2 and 3, in adjacent related positions, constitute a specific circuit diagram of the system schematically shown in Figure 1.

GENERAL DESCRIPTION

The control system including the television camera equipment basically comprises a main station, or position A, and a remote station, or position B, coupled to one another by a suitable link, such as illustrated coaxial cable link 3. A small box or panel 6 at the main position A has control push-buttons 9–12 located for convenient and selective operation by an attendant thereat. With operation of one of the push-buttons 9–12, predetermined code signals are automatically transmitted over the coaxial cable 3 to the associated television camera control equipment 7 at the remote station B.

Camera control equipment 7 at remote station B effects adjustment of the video camera 5 in a direction which is related to the nature of the code signals received and for a period of time an operating signal is received. As the video camera 5 is adjusted to a different position, the nature of the video signals which are coupled over coaxial cable 3 to the television picture receiver equipment 1 at the main sttaion A is accordingly changed. It will be apparent, therefore, that the attendant need merely operate the particular push-buttons 9–12 for the appropriate period of time and any desired portion of a large viewing field will be reproduced on a television picture or video receiver 1 at the main station. A transmitter set may, of course, be provided in lieu of the television picture receiver unit 1 at control station A if the signals are to be coupled to a further associated point in the system.

As noted above, the control equipment 6 and 7 is operative to perform any number of timed duration functions by transmitting short trains of direct current pulses over the coupling link 3 between the control equipment 6, 7 at the respective stations A—B. The direct current pulses in the disclosed embodiment have a repetition rate of approximately 14 pulses per second to permit transmission thereof below a normal voice channel over coaxial cable carrying video and/or audio signals, or over other coupling links such as the signalling link of a carrier or telegraph circuit. As shown hereinafter the line relay units of the control equipment are such that the system will operate reliably over metallic wire circuits of up to 2500 ohm impedance, or will operate directly into a carrier or other transmission channel. In one specific single-digit system in which six control functions were available, the control equipment 6, 7 at both the remote and control terminals comprised a flush panel unit 3½" x 19" in size. Additional control functions are added to the single-digit system by adding an additional relay at each equipment set 6, 7, the system having a total capacity of twenty functions with the panel for a twenty function unit being only 5½" x 19" in size.

It will be obvious to the parties skilled in the art that a two-digit system employing the concepts of the present teaching may be utilized to provide from 16 to 100 control functions at a single remote station, or alternatively, a smaller number of functions if more than one remote station is to be controlled from the main station A. In the two-digit system, the first digit is utilized to select the proper remote station, and the second digit is utilized to perform the controlling function, it being apparent that a series of remote stations in such manner may be controlled over a single wire pair with one control panel.

In the specific embodiment shown hereinafter the power input requirements were in the nature of 95–130 volts A.C. with no power consumption in the idle condition. During pulsing the system required up to 10 watts. The pulse output of the respective units 6, 7 comprises direct current pulses of approximately 100 volts amplitude at the rate of 14 pulses per second. In such arrangement, a line impedance of approximately 500 volts D.C. balance to ground was provided, the balance coil windings presenting a very high impedance to RF currents.

In accomplishing an operation at the remote station, the attendant merely depresses a preassigned one of the push-buttons at the main station camera control equipment 6, and the associated equipment at the remote station camera control equipment 7 operates to effect corresponding adjustment of the position of the television camera, the adjustment being effected for the period of time within limits, that the push-button is maintained in the depressed condition. As the push-button is released the control function is terminated. Thus if the attendant at the main station desires to move the camera up in a vertical direction, the push-button 9 (U) on the camera control equipment 6 is depressed, and the signals transmitted over coaxial cable 3 to the camera control equipment 7 will control the same to effect adjustment of the television camera 5 in a vertical direction for the period of time that the push-button is depressed at the main station.

In the illustrated embodiment control buttons are provided for effecting movements in the up, down, left or right directions, these being the more basic movements desired in the control of most viewing equipment. It will be apparent to parties skilled in the art, however, that further camera positioning functions or off-on functions, such as the adjustment of the light intensity for the camera viewing area, may be provided by adding a control relay to the equipment 6, 7 for each additional control function as described above. These and other features and advantages of the novel invention will be apparent from the following detailed description of one specific embodiment of the invention.

SPECIFIC DESCRIPTION

With reference to the drawings, Figure 2 sets forth the specific equipment which is located at the main station A, and Figure 3 sets forth the specific equipment which is located at the remote station B, the descriptive terms "station" and "position" being utilized interchangeably hereinafter. With reference to Figure 2, the camera control equipment transmitter 6 thereat comprises a battery eliminator 8 which is adapted for use with a conventional 110 volt 60 cycle alternating current source, and which is operative to supply direct current potential to the positive and negative buses of the local control equipment; manually operable non-locking or push-button keys 9, 10, 11 and 12 which are functionally labeled also U, D, R, and L to represent "up," "down," "right," and "left" control operations; twin-wound control relay 13; self-interrupting pulse generating relays 14 and 19 for pulsing over the coaxial cable 3; and a counting chain comprising counting relays 15, 16, 17, 18 and sequence relays 20, 21, and 22 for controlling the number of pulses transmitted over the cable.

The camera control equipment receiver 7 (Figure 3) comprises a battery eliminator 30 which is adapted for use with a conventional 110 volt 60 cycle source alternating current source, and supplies direct current potential to the positive and negative buses of Figure 3; and also to the line relay circuit for the system including pulse generator relay 19 at the control station and pulse receiving relay 23 at the remote station; control relay 24; pulse off-normal relay 25; and a counting chain comprising counting relays 26, 27, 28, 29 and sequence relays 31, 32, and 33 for selecting the functional circuit to be energized as different control signals are received. The television camera 5 and associated mounting mechanism may be of the type commercially available, wherein energization of conductor terminal C along with one of the conducting terminals U, D, R, L, effects adjustment of the television camera in a corresponding direction.

The pulse generating relay 19 (or control station line relay) is coupled over the center conductor and sheath of the coaxial cable 3 to the pulse receiving relay (or remote station line relay) 23, and the potential buses thereat, the control equipment 6 at the main station A effecting pulsing of the line relays, in series as shown hereinafter to effect advancement of the chains at each station in a circuit selecting operation.

In the drawings:
(1) A single winding fast relay is represented by a circle.
(2) A single winding sleeved relay is represented by two concentric circles.
(3) A single winding slugged relay is represented by a very heavy circle.
(4) A twin wound relay is represented by two circles and diameters. The same designation of the relay is placed above one diameter and below the other diameter.

(5) Normally closed contacts are represented by the symbol ≠.

(6) Normally open contacts are represented by the symbol =.

SPECIFIC OPERATION

Down control

For the purposes of illustration, it will be initially assumed that the equipment is in its normal energized condition in which the battery eliminators 8 and 30 are energized by 110 volts, 60 cycle current; the television camera 5 is adjusted to view a given area, and video signals indicative of such view are being transmitted over coupling link 3 to the television receiver unit 1.

Assuming now that the attendant desires to obtain a visual display of the area below the area presently scanned, it is apparent that the camera must be tilted in a downward direction. Accordingly, the manually operable key 10 (labeled D) at the control station is depressed and held in such position until the visual picture on the receiver 1 indicates to the attendant that the camera at the remote station has been tilted sufficiently to obtain the desired view. At such time key 10 is released, and the adjustment of the camera position is automatically terminated. The operation of the equipment 6, 7 in effecting such control is now set forth.

As the attendant depresses key 10(D), a circuit is completed for control relay 13 (Fig. 2) over the path which extends from — battery over the right winding of relay 13, normally closed contacts 18C of relay 18, contacts 10D—10C of closed key 10, and contacts 9A, 9B of key 9 to positive battery. Relay 13 operates, and at its contacts 13A prepares a circuit to the winding of relay 15; at its contacts 13B prepares locking circuits for the counting relays 15–18 in series with the sequence relays 20–22; and at its contacts 13C completes the energizing circuit for control station line relay 19 (Fig. 2) in series with the remote station line relay 23 (Fig. 3) over a path which extends from — over the left winding of relay 23, the sheath of the coaxial cable 3 the right winding of relay 19, contacts 13C and 14B, the left winding of relay 19, the center conductor of the coaxial cable 3, the right winding of relay 23 to + (Fig. 3). Line relays 19 and 23 now operate to initiate advancement of the counting chain at the main and control station in a selection operation, the relays being operated and released in a pulsating manner by the pulses generated at the control station.

With reference to Figure 2, relay 19 operates and at its contacts 19A completes an operating circuit for sleeved relay 14 (which is of the slow to release type), over the path extending from —, the winding of relay 14, contacts 19A, 18C, 10D—10C, 9B—9A, to +. Relay 14 operates, and at its normally closed contacts 14B interrupts the energizing circuit for relays 19 and 23 to restore same. Relay 19 in releasing is effective at contacts 19A to open the circuit of relay 14. After an interval, as determined by its slow to release sleeved characteristics, relay 14 releases, and at its associated contacts 14B recloses the operating circuit for relays 19 and 23. Relays 19 and 14 thus pulse in a self-interrupting manner (relay 23 being pulsed along with relay 19) until the counting chain is advanced to the desired step to interrupt the operation of relay 14.

More specifically, pulsing relay 14, in its repeated operation and release, is effective at its contacts 14A to advance the counting chain at the main station a corresponding number of steps. With the first closure of contacts 14A, the first counting relay 15 is operated over the path which extends from —, over the winding of relay 15, contacts 20B, 21B, 22B, 13A, 14A, —. Relay 15 operates, and at its contacts 15a extends its operating + potential over the winding of associated sequence relay 20, contacts 21C and 13B to +, relay 20 being shunted so that it does not operate at this time; and at its contacts 15B, prepares a circuit for effecting operation of relay 16 on the next pulse.

With the further pulsing of relay 14 and the first opening of its contacts 14A, the shunt is removed from relay 20, and relay 20 operates in series with relay 15 over the path which extends from —, over the winding of relay 15, contacts 15A, the winding of relay 20, contacts 21C and 13B to +. Relay 20 operates, and at its contacts 20A further prepares an operating circuit for relay 16; at its contacts 20B holds open the original operating circuit for the winding of relay 15; and at its contacts 20C opens an additional point in the holding circuit of relays 17 and 22.

As the pulsing of relay 14 continues, and specifically, with the second closure of contacts 14A, the second counting relay 16 operates over the path which extends from —, over the winding of relay 16, contacts 15B, 20A, 21B, 22B, 13A, and 14A to +. Relay 16 operates, and at its contacts 16A extends its operating + over the winding of relay 21, contacts 22C and 13B to +, relay 21 being shunted; and at its contacts 16B, prepares a circuit to operate relay 17. With the second opening of contacts 14A, the shunt is removed from the winding of relay 21, and relay 21 operates in series with relay 16 over the path which extends from —, over the winding of relay 16, contacts 16A, the winding of relay 21, contacts 22C and 13B to +. Relay 21 operates and at its contacts 21A prepares a circuit for relay 17; at its contacts 21B holds the original circuits of relays 15 and 16 open; and at its contacts 21C releases relays 15 and 20.

With the continued pulsing of relay 14, and specifically with the third closure of contacts 14A, an operating circuit is completed for the third counting relay 17 which extends from —, over the winding of relay 17, contacts 16B, 21A, 22B, 13A, and 14A to +. Relay 17 operates and at its contacts 17A extends its operating + to the winding of associated sequence relay 22 which is shunted by closed contacts 14A, and at its contacts 17B prepares a circuit for relay 18. With the third opening of contacts 14A, the shunt from relay 22 is removed, and relay 22 is energized in series with relay 17. Relay 22 operates and at its contacts 22A prepares a circuit for relay 18; at its contacts 22B holds open the original operating circuits of relays 15, 16 and 17; and at its contacts 22C releases relays 17 and 21.

As the pulsing of relay 14 continues, and specifically with the fourth closure of contacts 14A, an energizing circuit is completed for relay 18 which extends over the path from —, winding of relay 18, contacts 17B, 22A, 13A, 14A, to +. Relay 18 operates and at its contacts 18A extends its operating + through the windings of relay 20, contacts 21C and 13B to +, relay 20 being shunted by closed contacts 14A; at its contacts 18D (which close before contacts 18C open), provides a holding circuit for control of the left hand winding of relay 13 which extends from — over the left winding of relay 13, contacts 18B, 10D—10C, 9B—9A, to +; and at its contacts 18C opens the circuit of the right winding of relay 13 and relay 14 to prevent the reoperation thereof.

Thus as the desired step in the chain is selected the equipment automatically disables the right hand winding of control relay 13 which was operative during the step selection; and after such selection connects the left hand winding of relay 13 to the manual key which is depressed at this time (Down Key 10, in the present example). It will be apparent that the left hand winding of relay 13 is maintained energized and the line relays 19, 23 are maintained operated for the period that the key is held depressed by the attendant.

As relay 14 releases, the opening of its contacts 14A (i.e. the fourth opening) removes the shunt from sequence relay 40 which operates in series with relay 18;

and at its contacts 14B reoperates line relays 19 and 23 in the self-pulsing circuit. Relay 19 operates, and at its contacts 19A attempts to recomplete the energizing circuit for relay 14 which is maintained interrupted by open contacts 18C. Relay 20 operates and at its contacts 20a prepares a circuit for further chain relays (if so equipped); at its contacts 20b holds the circuit of relay 15 open; and at its contacts 20C releases relays 17 and 22.

It will be apparent from the foregoing description that each of the push-buttons 9–12 which are assigned to control a particular operating function, such as up, down, right or left movement of the video camera, is interconnected with the contacts of an associated one of the counting chain relays to terminate stepping of the chain as such step in the chain is reached. Thus operation of the up button 9 will result in stepping of the chain to the third step relay 17 (see contacts 9C, 9D, 17C, 17D); operation of the down button 10 will result in the stepping of the chain to the fourth step relay 18 (see contacts 10C, 10D, 18C, 18D); operation of the right button 11 will result in the stepping of the chain to the first step relay 15 (see contacts 11A, 14D, 15C, 15D); and the operation of the left button 12 will result in the stepping of the chain to the second step relay 16 (see contacts 12C, 12D, 16C, 16D). The manner in which further control functions may be included in the system by adding a single relay to the counting chain for each additional function will be apparent from such description.

The camera control equipment 6 is thus basically operative to transmit a code set of impuses to effect a control operation at the remote station, code sets having a different number of impulses being transmitted to effect different control operations.

OPERATION AT CONTROLLED END (FIG. 3)

At the remote station the line relay 23 pulses in synchronism with the line relay 19 at the control station to advance the counting chain relays 26–29 to a corresponding step in the chain. More specifically, as line relay 23 operates in series with line relay 19 responsive to closure of the line loop by contacts 13C at the main station, line relay 23 at its contacts 23A completes an obvious circuit for control relay 24; and at its contacts 23B holds open the circuit of the first counting relay 26. In that contacts 23B open before contacts 24A close, the operating circuit of relay 26 is held open until pulsing begins.

It is recalled that the first pulse which operates the counting chain at the main station is initiated by the closure of contacts 14A incident to the operation of pulsing relay 14 thereat. At the same time relay 14, at its contacts 14B, opens the line loop, releasing line relay 23 at the remote station. As relay 23 releases at the beginning of the first pulse, it is effective at its contacts 23B to complete energizing circuits for the first counting relay 26 and the pulse off-normal relay 25, the circuit for relay 26 extending from —, over the winding of relay 26, contacts 31B, 32B, 33B, 33D, 32D, 31D, 24A, and 23B to +; and the circuit for relay 25 extending from —, over the winding of relay 25, contacts 33D, 32D, 31D, 24D, and 23B to +. Relay 23 at its contacts 23A also opens the circuit of slugged slow-to-release relay 24, which by reason of the slug does not release during pulsing, and which is held closed after pulsing. Relay 26 operates, and at its contacts 26A extends its operating + over contacts 26A, the winding of relay 31, contacts 32C and 24B to +, relay 31 being shunted at this time. Relay 25 closes its contacts 25A, by-passing contacts 31D, 32D, and 33D.

It should also be recalled that with the opening of contacts 14A incident to the release of relay 14, the first pulse which operated the counting chain at the main station is terminated. At the same time relay 14, in releasing, recloses the line loop at contacts 14B, reoperating line relay 23 at the remote station to end the first pulse thereat. As relay 23 reoperates, it is effective at its contacts 23A to complete an energizing circuit for relay 24; and at its contacts 23B opens the circuit of relay 25 and removes the shunt from sequence relay 31 which operates in series with counting relay 26. Relay 25 is of the sleeved slow to release type and does not release during pulsing, but releases an interval after pulsing ceases. Sequence relay 31 at its contacts 31A prepares a circuit for relay 27; at its contacts 31B holds open the circuit of relay 26; and at its contacts 31C opens a point in the circuit of relays 28 and 33.

At the beginning of the second pulse, relay 23 releases, to complete an operating path at its contacts 23B for counting chain relay 27 which extends from —, over the winding of relay 27, contacts 26B, 31A, 32B, 33B, 25A, 24A, and 23B to +; and at its contacts 23A opens the circuit of relay 24 which remains operated; and at its contacts 23B also recompletes the path for relay 25 from —, over the winding of relay 25, contacts 25A, 24A, and 23B to +. Relay 27 operates and at its contacts 27A extends its operating + to associated sequence relay 32 which is shunted until relay 23 releases. At the end of second pulse, relay 23 reoperates. Relay 23 at its contacts 23A closes the circuit of relay 24 which remains operated; and at its contacts 23B opens the circuit of relay 25 which remains operated; and at its contacts 23B also opens the original operating circuit of relay 27, energizing relay 32 in series therewith. Relay 32 operates and at its contacts 32A prepares a circuit for relay 28; at its contacts 32B holds the original circuits of relays 26 and 27 open; at its contacts 32D holds open the pulsing circuit to the chain in parallel with contacts 25A; and at its contacts 32C releases counting chain relays 26 and 31.

At the beginning of the third pulse, relay 23 releases, and at its contacts 23A opens the circuit of relay 24; at its contacts 23B completes an energizing circuit for relay 28 which extends over the path from —, the winding of relay 28, contacts 27B, 32A, 33B, 25A, 24A, and 23B to +; and at its contacts 23B extends a holding pulse via contacts 25A to relay 25. Relay 28 operates and at its contacts 28A extends its operating + to relay 33; and at its contacts 28B prepares a circuit for relay 29. At the end of the third pulse, line relay 23 reoperates, and at its contacts 23 closes the circuit of relay 24; at its contacts 23B terminates the pulse to relay 25 and disconnects the original operating circuit of relay 28, allowing relay 33 to operate in series therewith. Relay 33 operates and at its contacts 33A prepares a circuit for relay 29; at its contacts 33B holds the original circuits to relays 26, 27, and 28 open; at its contacts 33D holds the circuit in parallel to contacts 25 open; and at its contacts 33C, releases relays 27 and 32.

At the beginning of the fourth pulse, relay 23 releases, and at its contacts 23A opens the circuit of relay 24; and at its contacts 23B completes an energizing circuit for counting chain relay 29 and a holding circuit for relay 25, the operating circuit for relay 29 extending from —, over the winding of relay 29, contacts 28B, 33A, 25A, 24A, and 23B to +. The holding circuit completed for relay 25 extends from —, through the winding of relay 25, contacts 25A, 24A and 23B to +. Relay 29 operates and at its contacts 29A extends its operating + to the winding of relay 33 which is shunted; and at its contacts 29C prepares a point in the control circuit for the adjustment means which are operative to adjust the television camera in a downward direction.

At this time, as counting chain relay 18 at the main station opens the circuit of pulsing relay 14 thereat to initiate the fourth pulse, relay 14 restores and at its contacts 14B recloses the line loop circuit to operate line relays 19 and 23 in series. In that the chain has now advanced to the step assigned to the "down" control function (the fourth step), the fourth counting chain relay 18 at the main station is effective to interrupt the pulsing circuit for relays 14 and 19, and relay 19 is held operated. Accordingly relay 23 is maintained operative and at its contacts 23A holds control relay 24 operated; at its contacts 23B removes the shunt from relay 31, allowing it to operate in series with relay 29; at its contacts 23B holds open the holding circuit of pulse off-normal relay 25; and at its contacts 23C further prepares a further point in the energizing circuit to the control means for positioning the television camera.

Sequence relay 31 operates and at its contacts 31A prepares the circuit of subsequent counting relays (if equipped); at its contacts 31B holds the original circuit of relay 26 open; and at its contacts 31D holds the circuit parallel to contacts 25A open; and at its contacts 31C releases relays 28 and 33. After an interval, as determined by its slow to release characteristics, relay 25 releases. Relay 25 in restoring is effective at its contacts 25A to open its own holding circuit and the driving circuit to the counting chain relays which extend in parallel with the path through sequence relay contacts 31D, 32D and 33D (which is held open by the operated one of the sequence relays). Accordingly, if any further pulsing of relay 23 occurs, both of the parallel paths are open and the pulse does not reach the counting chain.

Control relay 25 in its release is also effective at its contacts 25C to complete the control circuit for the selected one of the circuits for the mounting mechanisms of the television camera, the circuit selected in the present example extending to the mechanism for adjusting the camera in a "down" direction as determined by operation of the chain to the fourth step (relay 29). The control circuit thus completed extends from a potential source (not shown) over common conductor C, over contacts 23C, 25C, and 29C over "down" conductor D to the adjusting equipment (not shown) and the second side of the potential source. As would be appreciated by one skilled in the art, this energizes the down control mechanism which causes the camera to tilt downward progressively for as long as the circuit is completed thereto.

The attendant maintains the "down" button 10 at the main station in the depressed or closed position until the desired change of the position of the remote camera is effected, which is in turn determined by observation of the display on the picture receiver 1. At such time as the desired adjustment is effected, the attendant releases the manual control button 10 to restore the line relays 19, 23, and thereby terminate the downward adjustment of the camera at the remote station.

More specifically, with the release of button 10, contacts 10D are opened to interrupt the holding circuit of relay 13, which releases immediately, and at its contacts 13C opens the line loop for line relays 19 and 23; and at its contacts 13B opens the holding circuit for counting chain relay 18 and sequence relay 20.

Line relay 23 restores and at its contacts 23C immediately opens the "down" control circuit of S; at its contacts 23B prepares a circuit to the counting chain relay which is held open by contacts 24A of relay 24; and at its contacts 23A opens the circuit of relay 24, which releases after an interval as determined by its slugged slow-to-release characteristics. Relay 24 restores and at its contacts 24B effects the release of relays 29 and 31. The equipment is thus restored to a normal ready state for a subsequent operation.

It should be observed that limit switches may be connected in the operating circuits for the adjusting equipment if desired. Thus if key 10 had been operated so as to cause the tilting of the camera to the limit of its downward limit, the limit switch (not shown) in the television camera mounting mechanism 5 would open the down control circuit to prevent damage to the adjusting equipment. Such limit switch would ostensibly not be included in the right and left or the up and down contact circuits if 360° rotation is desired in both directions.

UP CONTROL

The control system in the disclosed embodiment is operative to effect adjustment of the video camera to different positions in the right, left and up directions in a similar manner, the circuit operations effecting the different control functions being similar to that set forth hereabove. In the adjustment of the camera in an upward direction, for example, the control button 9(U) is depressed, and the counting chains at the main and remote stations are advanced to the third position (relays 17, 28). As the line relay 23 operates and the control relay 25 restores at the remote station following advancement of the chains to the third step, control circuit is completed for the equipment which is operative to adjust the video camera in an upward direction, the circuit extending from a potential source (not shown) associated with the television camera and mounting mechanisms 5 over common conductor C, contacts 23C, 25C and 28C, the "up" conductor U, and the mechanism for adjusting the camera in the upward direction to the potential source. The camera is adjusted upwardly until such time as the operator releases the key 9 at the main station, and the equipment is restored to a ready state in the manner above described.

In a similar manner the camera may be rotated to the right by depressing the control button 11 (R) at the main station and by maintaining such button in the depressed position until such time as the desired adjustment is obtained. In such event, the operation of the control button 11 controls the counting chains at both stations to advance to the first step, whereby the first counting chain relays 15 and 26 at the receiving station are maintained operative. As line relay 23 at the remote station operates and control relay 25 restores following advancement of the chain to the first step, a control circuit for effecting adjustment of the video camera in the direction to the right is completed from the potential source associated with the television camera mechanism 5 over common conductor C, contacts 23C, contacts 25C, 26C, the "right" conductor R, the mechanism for adjusting the camera to the right, and the potential source. The camera is adjusted progressively to the right until such time as the operator releases key 11 at the control station to restore the equipment to a ready state.

In a similar manner the camera may be adjusted to the left by depressing the control button 12 (L) at the main station, the adjustment of the camera in such direction continuing for the period that the key is depressed. In such event, the operation of button 12 effects advancement of the counting chains at the main and remote stations to the second step, whereby relays 16 and 27 are maintained operated. As the line relay 23 operates and control relay 25 restores following advancement of the chain to the second step, a control circuit is completed for the mechanism which adjusts the camera to the left, such circuit extending from the potential source associated with the television camera mounting mechanisms 5 over the common conductor (C), contacts 23C, 25C and 27C, the "left" conductor L, the equipment for effecting adjustment of the camera to the left and the camera potential source.

RELEASE OF KEY BEFORE COUNTING CHAIN HAS ADVANCED TO PREDETERMINED POINT

According to a feature of the invention, the system will not effect a false operation of the camera if the button is momentarily depressed and released prior to advancement of the chain to the selected step in the chain. That is, if down key 10, for example, were depressed and released before the counting chains had advanced to the fourth step, and at the time the chain had advanced to the third step; chain relays 17 and 28 will be in the operated condition instead of relays 18 and 29. As key 10 is released, relay 13 restores immediately, to open contacts 13C, which in turn release line relays 19 and 23. Relay 23 restores immediately, and at its contacts 23C interrupts the portion of the control circuit which is common to each of the control circuits U, D, L and R to prevent the energization thereat, and at its contacts 23B completes a holding circuit over contacts 24 for relay 25, and an energizing circuit for counting relay 29 which operates incidentally without effect; and at its contacts 23A opens the circuit of relay 24. Thus, even though contacts 28A and 29A close, the release of relay 23 opens contacts 23C in the common lead so that no control function can occur.

After an interval as determined by its slow to release slugged characteristic, relay 24 releases, and at its contacts 24B interrupts the energizing circuit for relays 28 and 33; and at its contacts 24A interrupts the energizing circuit for relay 29. Relays 28 and 29 restore and at their contacts 28A and 29A further interrupt the circuits for the "up" and "down" control leads. Relay 24 at its contacts 24A opens the holding circuit of slow release pulse off-normal relay 25, and relay 33 at its contacts 33D re-establishes the right hand branch of the parallel circuit comprising break contacts of the sequence relays. Contacts 24A, however, maintain such circuit interrupted. After an interval, relay 25 restores to return the circuit at the second station to a normal ready condition.

SHORT ON LINE WIRES

According to a further feature of the invention if an extraneous short should appear across the line wires, the equipment is prevented from effecting an undesired adjustment of the camera position in response thereto. Briefly, if a short is imposed across the line, line relay 19 would be unoperated and relay 23 would operate.

Relay 23 operates and at its contacts 23B immediately opens the circuit over which the counting chain is advanced; at its contacts 23A operates relay 24; and at its contacts 23C completes a point in the common conductor circuit C. However none of the contacts 28C, 29C, 26C, 27C would be closed as the counting chain has not advanced. As the short is removed, relay 23 restores, opening contact 23C in the common lead C. The release of relay 23 operates relays 25 and 26, relay 31 being shunted as described heretofore. Relay 25 operates and at its contacts 25C further opens the common lead C. Relay 23 in restoring is also effective at its contacts 23A to open the circuit of relay 24, and after an interval, relay 24 restores. Relay 24 in restoring is effective at its contacts 24A to open the energizing circuit for relay 25; and its contacts 24A and 24B opens the energizing circuits for relay 26. After an interval relay 25 restores, and at its contacts 25A—25B restores the circuits to a normal ready condition.

CONCLUSION

The novel invention sets forth a control system which is extremely flexible in its application and which is substantially more reliable by reason of the increased amount of detailed information which is made available to the attendant by the video camera equipment therein. The provision of a control system in which the camera may be adjusted to a number of different positions substantially increases the scope and utility of the arrangement; and the provision of a system in which such adjustment is continuously effected for the period that a control key is operated, provides a more expeditious and convenient form of supervision. Such reliability and preciseness of control adapts the unit for application in many different fields including fire control, automation control, highway, bridge and parking lot control, and many others too numerous to mention.

Additionally the flexible nature of the system which permits the ready expansion of the number of functional operations of the system by the simple expedient of adding one relay member to the counting chains at the respective stations for each additional function desired, makes possible the accomplishment of a more extensive control in an extremely economical manner. The specific embodiment wherein the existing coaxial cable which couples the television camera and television picture receiver equipment is utilized to provide a coupling means for the camera positioning equipment at the respective stations makes possible the addition of the positioning equipment to existing installations at a minimum of expense. Ostensibly, the elimination of the need for the installation of an additional cable pair for each control function of the camera results in a substantial saving in the cost of the original installation, as well as in the maintenance and upkeep thereof.

While a particular embodiment of the invention has been shown and described, it is intended in the appended claims to cover all such modifications and alterations thereof as may fall within the true spirit and scope of the invention.

What is claimed is:

1. In a television supervisory control system including a control station having video receiver equipment located thereat, a remote station having video camera equipment located thereat including adjustment means for selectively adjusting said camera equipment in different scanning operations, and coaxial cable means for coupling video signals from the camera equipment at the remote station to the receiver equipment at the control station; the combination of control equipment means at said control station including pulse generating means coupled to the outer sheath and center conductor of said coaxial cable means; selection means connected to selectively control said pulse generating means to transmit different code sets of direct current impulse signals over said cable means to said remote station, said pulse generating means being operative after each transmission of a code set to transmit a holding signal over said cable means for the period the selection means is maintained operated thereafter, different code sets representing different desired scanning movements of said camera equipment; and control equipment means coupled to said cable means at said remote station operative responsive to receipt of said code sets to initiate movement of said camera equipment by said adjustment means in the manner indicated by said code set, and to continue movement of said camera equipment in such manner for the period of receipt of said holding signal.

2. In a television supervisory control system including a control station having a television receiver unit located thereat, a remote station having a television camera located thereat, coaxial cable means for coupling the video output signals of the television camera at the remote station to the television receiver at the control station, and adjustment means for said television camera including at least a first adjusting means for adjusting the camera in a first direction, and a second adjustment means for adjusting said camera in a second direction; the combination of control equipment means at said control station selectively operative to generate coded signals to indicate the desired direction of adjustment of said television camera, means for coupling said coded signals to the outer sheath and center conductor of said coaxial cable and control equipment means at said remote station including means connected to said center conductor and said outer sheath of said conductor cable operative in response to said coded signals and means operatively controlled thereby to selectively energize the one of said first and said second adjusting means indicated by said coded signals.

3. In a television supervisory control system including a control station having a set of functional equipment located thereat, a remote station having a cooperatset set of functional equipment located thereat, coaxial cable means for coupling alternating current signals between the functional equipment at the control station and the remote station, and adjusting means for adjusting the functional equipment at the remote stations in different directional movements, the combination of control equipment at the main station including means connected to transmit direct current coded signals over the center conductor and the outer sheath of said coaxial cable indicative of the particular adjustment of the equipment desired thereat, and control equipment means at said remote station including means connected to said core and said sheath of said cable operative responsive to receipt of said direct current coded signals, and means controlled thereby to effect the adjustment of the equipment thereat in the direction indicated by said coded signals.

4. In a television supervisory control system including a control station having a set of functional equipment located thereat, a remote station having a cooperating set of functional equipment located thereat including means for adjusting said equipment in at least a first and a second direction, and link means for coupling the equipment at the control station and the remote station; the combination of control equipment means at said control station including pulse generating means coupled to said link means; selection means including a plurality of selection circuits, and means for selectively enabling each of said selector circuits, each of said selection circuits being operative as enabled to control said pulse generating means to transmit a different code set of direct-current impulse signals over said link means, said pulse generating means being operative after each transmission of a code set to thereafter transmit a direct-current holding signal over said link means for the period the selection circuit is enabled, different code sets representing different desired directional movements of said functional equipment, and control equipment means coupled to said link means at said remote station operative to respond to receipt of said coded signals to initiate adjustment of said functional equipment in the manner indicated by said code signal set, and to continue movement of said functional equipment in such adjustment for the period of receipt of said holding signal.

5. In a television supervisory control system including a control station having a set of functional equipment located thereat, a remote station having a cooperating set of functional equipment located thereat, and link means for coupling the equipment at the control station and the remote station; the combination of control equipment at said control station connected to said link means including pulsing means for coupling different code impulse sets to said link to indicate different desired control operations of the equipment at the remote station, said pulsing means being operative after each transmission of a code impulse set to thereafter transmit a hold signal of a duration representative of the desired duration of the control operation to be effected; and control equipment at the remote station for effecting the desired control operation for the indicated time period including a pulse responsive relay, means connecting said pulse responsive means to operate responsive to the receipt of said code impulse sets, a pulse off-normal relay connected to operate during receipt of said code impulse sets by said pulse responsive relay and to restore immediately subsequent thereto a counting chain connected for advancement by said pulse responsive relay in its operation responsive to said code impulse sets, and a control circuit for each desired operation of said functional equipment at the remote station including a contact on said pulse responsive relay, a contact on said pulse off normal relay, and a contact of the one of said counting chain relays assigned to said functional operation, said pulse off normal relay at its contact being operative to control completion of the current to the control circuit for the desired operation only after complete receipt of the coded impulse set and operation of said pulse responsive relay and said counting chain relay to predetermined conditions.

6. A supervisory control system as set forth in claim 5 which includes means for connecting said pulse responsive relay for operation responsive to occurrences of a short on said link, said pulse responsive relay control being connected to open the operating circuit for the control circuits in such operation.

7. In a television supervisory control system including a control station having a set of functional equipment located thereat, a remote station having a cooperating set of functional equipment located thereat, and link means for coupling the equipment at the control station and the remote station; the combination of control equipment at said control station connected to said link means including pulsing means for coupling different code impulse sets to said link to indicate the desired control operation to be effected at the remote station, and control equipment at the remote station for effecting the desired control operation including a pulse responsive relay connected to said link, a pulse off-normal relay controlled to operate by said pulse responsive relay during the period of receipt of a code impulse set over said link and to restore subsequent to complete receipt of a code impulse set, a relay counting chain including a set of sequence relays, and a pulsing circuit operatively controlled by said pulse responsive relay to pulse said counting chain and said off-normal relay during receipt of a code impulse set including a contact on said pulsing responsive relay, and a pair of branch paths, one path including a contact of each of said sequence relays, and the other path including a contact on said pulse off-normal relay connected to open said other path responsive to restoration of said pulse off-normal relay, whereby pulses received subsequent to advancement of the counting chain to the desired step are prevented from advancing said chain.

References Cited in the file of this patent

UNITED STATES PATENTS

| | | |
|---|---|---|
| 2,516,069 | Newhouse | July 18, 1950 |
| 2,852,760 | Eckhardt | Sept. 16, 1958 |